United States Patent [19]

Gluck et al.

[11] 4,438,166

[45] Mar. 20, 1984

[54] STRUCTURAL LAMINATE AND METHOD FOR MAKING SAME

[75] Inventors: David G. Gluck; Leon F. Barry, both of St. Petersburg, Fla.

[73] Assignee: The Celotex Corporation, Tampa, Fla.

[21] Appl. No.: 463,786

[22] Filed: Feb. 4, 1983

[51] Int. Cl.³ .................... B32B 5/20; B32B 5/28; B32B 31/12

[52] U.S. Cl. .................... 428/113; 156/79; 428/218; 428/285; 428/302; 428/317.1; 428/317.9; 428/319.1

[58] Field of Search ............ 156/79; 428/113, 218, 428/285, 298, 302, 317.1, 317.7, 317.9, 318.4, 319.1

[56] References Cited

U.S. PATENT DOCUMENTS

| | | | |
|---|---|---|---|
| 2,879,197 | 3/1959 | Muskat et al. | 156/79 |
| 3,627,603 | 12/1971 | Greig | 156/79 |
| 3,900,650 | 8/1975 | Sedore | 428/86 |
| 3,903,346 | 9/1975 | DeLeon et al. | 428/319.1 |
| 4,073,997 | 2/1978 | Richards et al. | 428/285 |
| 4,073,998 | 2/1978 | O'Connor et al. | 428/261 |
| 4,118,533 | 10/1978 | Hipchen et al. | 428/297 |
| 4,121,957 | 10/1978 | Allen | 156/79 |
| 4,121,958 | 10/1978 | Koonts | 156/79 |
| 4,204,019 | 5/1980 | Parker | 428/304.4 |
| 4,212,917 | 7/1980 | Skowronski et al. | 428/318.4 |
| 4,279,958 | 7/1981 | Ahmad | 428/215 |
| 4,292,363 | 9/1981 | Briggs | 428/247 |
| 4,292,369 | 9/1981 | Ohashi et al. | 428/319.1 |
| 4,386,983 | 1/1983 | Hipchen et al. | 428/319.1 |

*Primary Examiner*—William J. Van Balen
*Attorney, Agent, or Firm*—James W. Grace; Charles W. Vanecek

[57] ABSTRACT

A process for producing a structural laminate comprising the steps of providing a composite article comprising a facing sheet adhered to a thin, substantially incompressible yet expansible mat of long, layered glass fibers, applying a foam-forming mixture to the glass fibers, positioning a second composite article or a facing sheet over the applied foam-forming mixture, passing the facing sheets having the mat and the foam-forming mixture therebetween through the nip of two rotating rolls, and foaming the foam-forming mixture. The structural laminate is useful in thermal insulating applications.

20 Claims, 5 Drawing Figures

STRUCTURAL LAMINATE AND METHOD FOR MAKING SAME

BACKGROUND OF THE INVENTION

1. Field of the Invention

This invention relates to laminates and foam filled sheet products, both decorative and structural, and more particularly it relates to structurally rigid sheets of foam having glass fiber reinforcement, which are particularly useful in thermal insulating applications. It also relates to a method for forming such a product.

2. Description of the Prior Art

Foam products have been reinforced in various ways to give them added strength or other desirable physical properties which the foam itself is incapable of providing. These foam products have become increasingly useful in the building industry since they possess many properties which make them extremely valuable in this field. They have high structural strength coupled with relatively low density and thus are particularly well suited for use as core materials in sandwich type structural laminates. Furthermore, the rigid foam laminates are excellent heat insulators because of their fine closed cell structure. Many different techniques have been developed for manufacturing foam laminates, such as those described in U.S. Pat. Nos. 2,866,730, 3,172,072, 3,554,851, 3,578,544, 3,617,594, 3,627,603, 3,867,494, and 4,118,533.

The last-mentioned of the above patents, i.e., U.S. Pat. No. 4,118,533, discloses a relatively simple method of producing such foam laminates. In this method, a mat of glass fibers is contacted with a foam-forming mixture and the resulting fibrous mat/foamable mixture composite is contacted with a facing sheet(s) and then passed between the nip of two rotating rolls, thereby forcing the foam-forming mixture into the interstices between the glass fibers of the mat. After passing between the nip of the two rolls, the composite is next conveyed into an oven where the foam-forming mixture is permitted to expand and the fibers of the glass fiber mat separate under the influence of the expanding foam to become evenly distributed in the cured foam laminate. Through this simple method it has been possible to continuously manufacture at a high production rate a plastic foam insulation board having superior performance characteristics and a highly pleasing appearance.

Notwithstanding the general high quality of the continuous process of U.S. Pat. No. 4,118,533, it has the disadvantageous feature that the glass fiber mat and facing sheets are each separately fed to the nip of the two rotating metering rolls. Because the separately introduced mat of glass fibers and facers (e.g., thin sheets of aluminum foil) are subjected to variable tensions of considerable magnitude as they are pulled at high speed from their supply rolls toward the metering rolls, it transpires that the continuous operation is marred by drawbacks involving breakage and other damage to the facers and mat, e.g., foil breaks, "necking in" of the glass mat, glass mat splices, etc. The difficulty sometimes necessitates a lengthy shutdown of the production line. These problems result in raw material waste, rejected product, and general operating inefficiencies. It would be highly desirable if a simple and efficient method of continuously producing foamed laminates could be found which incorporates the advantageous features of the method disclosed in U.S. Pat. No. 4,118,533 but avoids to a great extent the above-mentioned disadvantages associated with this method.

OBJECTS OF THE INVENTION

It is therefore an object of the present invention to provide an improved method for the continuous production of a foam laminate comprising a faced, glass fiber-reinforced foam plastic core in a simple and economical manner, and with substantially reduced damage to the glass fiber and facing sheet materials utilized during production and a concomitant reduction in rejected product.

It is another object of this invention to produce a laminate by contacting a foam-forming mixture with a composite made of glass fibers and a facing sheet and thereafter foaming the foam-forming mixture.

It is a further object of this invention to form a structural laminate using a low-loft mat of long glass fibers which is bonded to a facer, the mat being thin and expansible under the influence of the expansion of a foam-forming mixture which is made to penetrate and completely fill the interstices between the fibers of the mat during production of the laminate.

It is yet another object of this invention to utilize a foamable polymeric resin in combination with a mat(s) of long glass fibers and a facing sheet(s) so as to produce a strong laminate which is free of discontinuities and is characterized by a pleasing appearance and superior performance.

It is a further object of this invention to produce a structural laminate comprising a faced, glass fiber-reinforced foam plastic core which is very resistant to delamination and is particularly suitable for exposed applications.

It is a still further object of this invention to produce a structural laminate having a high insulation value and superior fire resistant properties, which would qualify for model building code approvals and approval by the Factory Mutual Research Corporation, an independent risk certification firm.

It is a yet further object of this invention to provide an insulation board comprising a glass fiber-reinforced foam plastic core with facers on the upper and lower board surfaces, the glass fiber concentration within the foam core being greater in the proximity of one or both of the board surfaces than in the region of foam to the interior of the board surface(s), whereby the board surface(s) reinforced by the greater concentration of glass fibers is rendered especially tough and impact-resistant, while the board overall still displays a superior dimensional stability and fire resistance.

It is still another object of this invention to provide a structural laminate which can be used in the building industry and is lightweight, highly insulating, thermally resistant, low in friability, and self-supporting.

These and other objects and advantages of the present invention will become more apparent to those skilled in the art when the instant disclosure is read in conjunction with the accompanying drawings in which.

DESCRIPTION OF THE INVENTION

Figure 1:
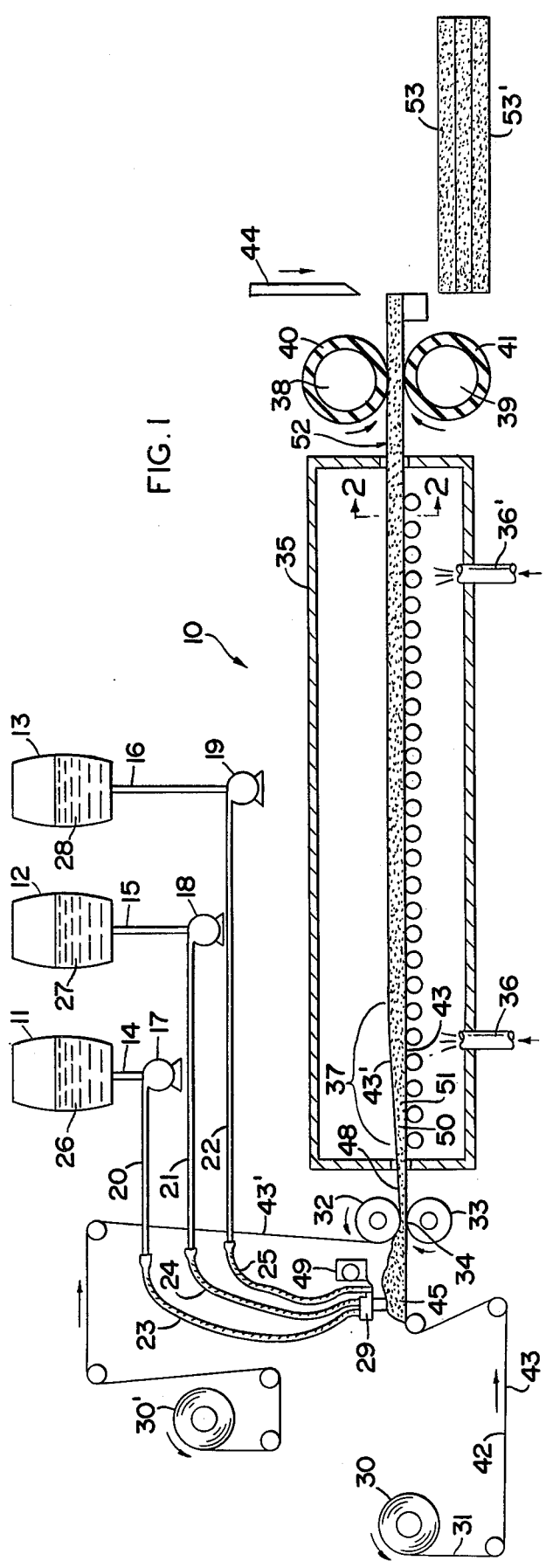
FIG. 1 is a schematic elevation of an apparatus suitable for practicing the process of the present invention.

The above objects were achieved in the method of the invention which utilizes a composite article(s) of a facing sheet and a reinforcing composition of fibers or filaments in the production of a faced, fiber-reinforced foam laminate. The composite article advantageously comprises a facing sheet and a fibrous mat with an adhesive therebetween to bond together the sheet and mat and bring about a high concentration of fibers proximate to the facing sheet in the finished foam laminate, as will be discussed hereinafter. The laminating method is suitably carried out by bringing at least one composite article of the invention into contact with a foam-forming mixture so that the side of the facing sheet on which the fibers abut contacts the mixture, and thereafter foaming the foam-forming mixture. Prior to contacting the foam-forming mixture, the facing sheet of the composite article is most advantageously cemented to the fibrous mat by a flame-retardant and/or low smoke-producing adhesive.

The finished structural laminate of the invention has at least one but preferably has two facing sheets, one on either side of a foam core. One or both of the facing sheets utilized in producing the structural laminate form part of a composite article of the invention, as discussed previously. The facing sheets can be constructed of a wide variety of flame-resistant materials, such as asbestos, glass fibers, metals, fire retardant papers, and composites thereof. In the broadest aspects of the invention, any metal can be employed, such as copper, brass, iron, steel, or aluminum. Aluminum is the preferred metal because of its ductility and the ease with which it can be manufactured into a material of suitable thickness.

The core of the structural laminate comprises a rigid foam formed from a foam-forming mixture. The foam-forming mixture is one which will result in a rigid foam.

Polyurethanes, polyisocyanurates, and phenolic polymers are well-known materials in laminates, particularly structural laminates, and encompass many desirable properties. Other polymers that can be foamed include rubber, polyvinyl chloride, urea-aldehydes, melamine-aldehydes, polystyrene, polypropylene, polyethylene, cellulose acetate, epoxy resin, acrylonitrile-butadiene-styrene-copolymer and silicones.

Suitable foaming resin compositions are disclosed in U.S. Pat. Nos. 2,577,277, 2,498,621, 2,572,568, 2,623,023 and 2,461,942. Other foamable resin compositions may be used.

The foamable resin compositions may contain any suitable blowing agent known to those skilled in the art, including carbon dioxide, ammonium carbonate, potassium carbonate, hydrogen peroxide and chlorinated and fluorinated hydrocarbons, such as trichlorofluoromethane.

Catalysts, surfactants, dyes and other special additives may be added to the foamable composition, as is well-known in the art, in order to effect certain properties. Surfactants, such as polyoxyethylene-sorbitan monopalmitates, polyoxyethylene sorbitan polydimethyl siloxane and polydimethyl siloxane polyoxyalkylene block copolymers, can serve as wetting agents in adhering fibers to foam and can affect the foam cell size by lowering surface tension.

In a most preferred embodiment of the invention, the composite article(s) utilized in forming the structural laminate comprises a facing sheet adhered to a thin, substantially incompressible yet expansible mat of glass fibers. The structural laminate is produced by contacting the composite article(s) with a foam-forming mixture. A sandwich is advantageously formed with the foam-forming mixture contained between a facing sheet and a composite article or between two composite articles of the invention, the side of the composite article(s) to which the glass mat is adhered contacting the foam-forming mixture, and the sandwich is passed through means for metering the amount of foam-forming mixture and causing it to fully penetrate between the fibers of said glass mat, as, e.g., through the nip of two rotating rolls, the nip between a doctor blade and fixed plate, etc. The mat of glass fibers is distinguished by having the fibers arranged in layers, and the fibers within each layer are long, and at an angle to the fibers in each next adjacent layer.

The composite article of the present invention is preferably made from a mat of long, generally straight glass fibers. The fibers of the mat are arranged in substantially evenly distributed layers, the layers being substantially parallel to one another. Within each layer, each of the glass fibers extends in a generally straight direction and is roughly parallel to the other fibers of the layer. Advantageously, the direction of the glass fibers in each layer is at an angle to the direction of the glass fibers in each next adjacent layer, as, e.g., at an acute or a 90 degree angle. The glass fibers are not short but rather long, generally having a length greater than one foot and preferably 5 to 12 feet. One or more fiber layers may comprise a plurality of long fibers which are substantially evenly distributed in a fiber aggregate having a greater than one fiber thickness in the horizontal plane. Intermingled with the glass fibers is a relatively minor proportion of a binder, such as poly(vinyl acetate) or preferably a silane modified polyester binder amounting to about 2 to 16 percent by weight of the combined glass fiber and binder. The glass fiber mat having this amount of fiber binder is dimensionally stable yet is expansible under the influence of the expansion of any foam-forming mixture caused to penetrate into the interstices between the fibers of the mat.

A method of making a low loft mat which satisfies the functional and structural requirements of this invention is to be found in U.S. Pat. No. 2,609,320 provided certain limitations are placed on the method. For example, in a mat acceptable for use in a laminate according to this invention, the glass fibers are attached to one another by an amount of fiber binder sufficient to make the mat of glass fibers dimensionally stable but insufficient to fill the interstices between the glass fibers. Preferably only a minimum amount of this fiber binder should be employed. Further the mat should not be expanded or puffed up in thickness as is taught in U.S. Pat. No. 2,609,320 but rather should be of low loft such that pressure applied to the faces of the mat will not substantially reduce the thickness of the mat and such that the mat does not elastically recover to any appreciable amount when the pressure is released from the faces of the mat. Of course, any other method can be used which would result in a batt of glass fibers having a structure substantially the same as that produced by the method of U.S. Pat. No. 2,609,320 with these restrictions.

The glass fiber mat is incorporated into the structural laminate in an amount which will insure the continued structural integrity of the laminate when it is exposed to high temperature and open flames yet not so much as to result in the deterioration of the surface of the structural laminate due to exposed single fibers. The glass fiber mat is functionally effective when included in the range of 1–24 gms/board foot of structural laminate. A structural laminate preferably comprises 2–20 gms of glass fiber mat per board foot of structural laminate.

The composite article of the invention may be manufactured in a conventional manner. Thus, the adhesive, which is preferably flame-retardant, is applied to the facing sheet and/or glass mat surface(s) to be bonded, either by brush, spray, roll, immersion, or any other suitable means. This may conveniently be followed by pressing together the facing sheet and mat surfaces, such as by passing the sheet and mat through a pair of rolls or pressing between two flat surfaces. The laminating operation can be suitably promoted by the application of heat, such as in the machine laminating procedure described in U.S. Pat. No. 3,694,305. The flame-retardant adhesive which is used in the laminating operation can be any of those conventionally employed in the formation of facing sheet/glass fiber composites such as those described in U.S. Pat. Nos. 3,202,567 and 3,694,305.

A particularly suitable process for producing a structural laminate according to this invention comprises the steps of depositing a foam-forming mixture onto a previously formed composite article comprising a facing sheet bonded to a thin, substantially incompressible yet expansible mat of long glass fibers, covering the deposited foam-forming mixture with a facing sheet or another composite article so as to form a sandwich type structure having the foam-forming mixture at its core, and passing the sandwich through means for metering the amount of foam-forming mixture and causing it to fully penetrate between the fibers of the glass mat(s), as, e.g., between the nip of two rotating rolls, thereby forcing the foam-forming mixture into the interstices between the glass fibers of the mat(s). The sandwich containing the foam-forming mixture then passes into an expansion zone wherein the foam-forming mixture expands under the influence of heat generated in exothermic reaction between the components of the foam-forming mixture. Under the influence of the expansion of the foam-forming mixture, a concomitant expansion of the glass fiber mat or mats occurs. The layers of glass fibers in the mat(s) separate and become distributed in the foam but maintain their same relative order. The process is desirably performed so that a substantial amount of the glass fibers expand during the foaming reaction to form a reinforcement for the resultant core foam, and a smaller proportion of the fibers remains in close proximity to the surface web material. The process can bring about a distribution of glass fibers throughout the entire or practically the entire foam core, although laminates having less glass expansion, as, e.g., into 5 to 75% of the core thickness, also can be produced. Structural laminates wherein the fibers are distributed in approximately 75 to 90% or more of the foam core thickness display particularly desirable physical properties. The foam-forming mixture having the glass fibers distributed therein is subjected to the influence of heat controllably added by the circulation of hot air between 100° F. and 350° F., preferably 150° F. and 250° F., and cured to a rigid foam structural laminate, the rigid foam completely filling the interstices between the glass fibers. This rigid structural laminate is then periodically severed into finite lengths, thereby forming discrete panels.

The laminates may be used for decorative panels in which case one side of the laminate is decorated or embossed. However, both facing sheets may be decorated.

A particularly suitable foam-forming mixture of the present invention is one which will result in a rigid foam characterized in that the major recurring chemical linkage therein is the isocyanurate moiety. This foam-forming mixture comprises an organic polyisocyanate and a polyol.

In the broadest aspects of the present invention, any organic polyisocyanate can be employed in the preparation of the foam core of the structural laminate. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'biphenyldiisocyanate, and 3,3'-dimethyldiphenylmethane-4,4'-diisocyanate; the triisocyanates such as 4,4', 4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene-polyphenyl isocyanates. These isocyanates are prepared by conventional methods known in the art such as the phosgenation of the corresponding organic amine.

The polymethylene polyphenylisocyanates desirably have a functionality of at least 2.1 and preferably 2.5 to 3.8. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

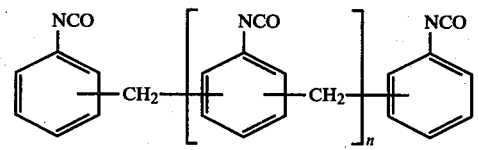

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6-21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In a preferred embodiment of the present invention, any diol having a low equivalent weight, which is generally between 30 and 100, and preferably between 30 and 75, and having two hydroxyl groups which pass the Zerewitinoff Test, can be employed in the present invention. Triols and higher polyols can be admixed with these diols in minor amounts generally less than 40 percent provided the equivalent weight of the mixture is within the specified range. The preferred diols are those of the following formula:

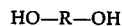

wherein R is selected from the group consisting of lower alkylene and lower alkoxyalkylene with at least two carbon atoms. Examples of suitable diols include, among others, ethylene glycol, 1,2-propanediol, 1,3-propanediol, 1,4-butanediol, diethylene glycol, dipropylene glycol, dimethylol dicyclopentadiene, 1,3-cyclohexanediol, and 1,4-cyclohexanediol. Diethylene glycol is a preferred diol since it gives a core of excellent friability and facer sheet adhesion.

Other polyols or mixtures of polyols can be employed in the production of the polyisocyanurate foam core of the invention. Desirable polyols for use in the present invention are those described in U.S. Pat. Nos. 4,212,917 and 4,237,238, and in U.S. application Ser. No. 344,459, filed Feb. 1, 1982, and U.S. application Ser. No. 372,904, filed Apr. 29, 1982, the disclosures of which patents and applications are hereby incorporated by reference.

In order to ensure complete reaction, the polymethylene polyphenylisocyanate and the polyol are generally mixed in an equivalent ratio of 1.5:1 to 6:1 and preferably 2:1 to 5:1. In ranges outside these proportions the reaction yields a product having undesirable physical characteristics. At higher ratios the product has an undesirably high friability. At lower ratios the product has an undesirably high flammability.

In the preparation of the polyisocyanurate rigid foam core, any catalysts known to catalyze the trimerization of isocyanates to form isocyanurates and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris (dimethylaminomethyl)phenol, and an alkali metal carboxylate, such as potassium-2-ethyl hexoate, the synthesis and use of which are described in U.S. Pat. No. 4,169,921, the disclosure of which is hereby incorporated by reference. The equivalent ratio of tertiary amino phenol to alkali metal carboxylate in the cocatalyst composition is desirably about 4:1 to 2.5:1. Another catalyst system is that employing an epoxide, an N-substituted aziridine, and a tertiary amine. The synthesis and use of such a catalyst is described in U.S. application Ser. No. 251,279, filed May 8, 1972, now U.S. Pat. No. 3,799,896. The catalysts generally comprise from 0.1 to 20 and preferably from 0.3 to 10 weight percent of the total foam-forming mixture.

Any blowing agent typically employed in similar prior art foam products can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorofluoromethane is a preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. application Ser. No. 282,322, filed July 10, 1981. Included among the latter surfactants is the product supplied by Jim Walter Resources, Inc. under the trade designation "CGS-100." Generally, the surfactant comprises from about 0.05 to 10, and preferably from 0.1 to 6, weight percent of the foam-forming composition.

Other additives may also be included in the foam formulations. Included are flame retardants, such as tris (2-chloroethyl)-phosphate, dispersing agents, plasticizers, fillers and pigments.

Referring now to the drawings, and in particular to FIG. 1, there is shown schematically an apparatus 10 suitable for use in connection with the present invention. The apparatus 10 comprises tanks 11, 12 and 13 for containing the foaming ingredients and additives such as blowing agent, surfactant, etc., each respectively connected to outlet lines 14, 15, and 16. The lines 14, 15 and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of the composite article 31 of the invention comprising an upper glass fiber mat material 42 adhered to a lower facing sheet material 43, and a roll 30' of upper facing sheet material 43'. The apparatus 10 is also provided with metering rolls 32 and 33 and an oven 35 provided with vents 36 and 36' for introducing and circulating hot air. The apparatus 10 is also provided with pull rolls 38 and 39 each of which preferably has a flexible outer sheath 40 and 41. The apparatus 10 is also provided with cutting means 44 for severing the structural laminate produced by this process into finite lengths thereby producing discrete panels.

In operation, the tanks are charged with the foam-forming mixture in whatever manner is convenient and preferred for the specific polymer. For instance, for a urethane foam, the polyol can be in one tank, the polyisocyanate in another and catalyst in a third. Other polymers such as polyvinyl chloride can be used as a dispersion in plasticizers and a blowing agent introduced. Or polyvinyl chloride can be extruded as can polystyrene, cellulose acetate and the polyolefins among others. Rubber and urea-formaldehyde can be frothed and admixed with the appropriate blowing agent and surfactant. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25 whereupon they are mixed in the mixing head 29 to form the liquid foam-forming mixture 45 which contacts the thin, substantially incompressible yet expansible mat of glass fibers 42 of the composite article 31 fed from the roll 30 toward the nip 34 between the two rotating metering rolls 32 and 33.

By virtue of rotation of the pull rolls 38 and 39, the lower composite article 31 is pulled from the roll 30, and the upper facing sheet 43' is pulled from the roll 30'. The composite article 31 and sheet 43' having the foam-forming mixture 45 therebetween pass through the nip 34 of the two rotating metering rolls 32 and 33. The mixing head 29 is caused to move back and forth, normal to the running length of the mat by virtue of a reciprocating means 49. In this manner, an even amount of foam-forming mixture 45 can be maintained upstream from the nip 34 and in contact with the mat of glass fibers 42. The mat of glass fibers being substantially incompressible yet expansible has such a low loft that the pressure applied to the mat 42 by the rotating rolls 32 and 33 does not substantially reduce the thickness of the mat 42 but rather the foam-forming mixture 45 is caused to penetrate and completely fill the interstices between the glass fibers forming the mat 42. Further, the mat 42 is of such a low loft that after passing through the nip 34 the glass fibers do not themselves elastically recover but expand under the sole influence of the expansion of the foam-forming mixture 45. The velocity of the composite article 31 as it passes between the nip 34 of the two rolls substantially equals the velocity of the facing sheet 43'. After passing between the nip of the two rolls 32 and 33, the composite structure 48 now comprises a lower and upper facing sheet 43 and 43' having therebetween a glass fiber mat 42 bonded to lower sheet 43 and completely permeated by the foam-forming mixture 45 which wets the glass fibers of the mat 42.

This composite structure 48 now passes into oven 35 and while in the oven 35 the foam-forming mixture expands in an expansion zone 37. This expansion is initiated by heat generated in an exothermic reaction between the components 26, 27, and 28 of the foam-forming mixture 45 and is regulated by heat added to the oven 35 by the hot air from vents 36 and 36'. The temperature within the oven 35 is controlled by varying the temperature of the hot air from vents 36 and 36' in order to insure that the oven temperature is maintained within the desired limits necessary to cure the foam employed, as, e.g., from 100° F. to 350° F. and preferably 150° F. to 250° F. While in the expansion zone 37 the layers of fibers 50 of the glass fiber mat separate under the influence of the expanding foam 51 in such a manner as to become distributed in the foam 51 in planes substantially parallel to the planes of the facing sheets 43 and 43'.

The foam 51, under continuing influence of the heat added to the oven 35 by the controlled introduction of hot air from vents 36 and 36', cures to form the structural laminate 52 of this invention. The structural laminate 52 then leaves the oven 35, passes between the pull rolls 38 and 39, and is cut by cutting means 44 into finite lengths thereby forming discrete panels 53 and 53' of the structural laminate 52.

Figure 2:
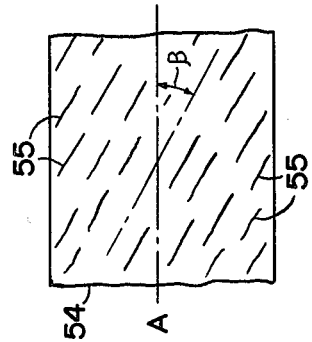
FIG. 2 is an enlarged schematic sectional view of a structural laminate taken along line 2—2 of FIG. 1.

In FIG. 2 there is shown schematically an enlarged sectional view of a structural laminate 52 of the present invention taken along line 2—2 of FIG. 1. The structural laminate 52 shown in FIG. 2 has two planar facing sheets 43' and 43. It will be appreciated by persons of ordinary skill in the art that a structural laminate of this type can be made in such a manner as to only have a single facing sheet. A thin primer coating, such as an epoxy or acrylic coating, advantageously covers the inner surface of the metal facing sheet 43'. The structural laminate 52 shown in FIG. 2 further comprises a rigid foam 54 formed from the foam-forming mixture 45 of FIG. 1. Distributed in the foam 54 is a multitude of long glass fibers 55 arranged in layers which are substantially parallel to the facing sheets 43' and 43. The rigid foam 54 completely fills the interstices between the glass fibers 55, the glass fibers being held in fixed relationship with respect to each other by the rigid foam. As shown in FIG. 2, the concentration of glass fibers is greatest near to bottom facing sheet 43—the facing sheet which formed part of composite article 31—and diminishes with increasing distance from sheet 43. The expansion of the glass mat into the foam can be regulated, depending on the end properties desired in the laminate. Increases in the binder content of mat 42 and/or in the amount of fire-retardant adhesive binding mat 42 to sheet 43 can be employed to reduce glass fiber expansion into the foam core of the laminate. Generally speaking, the less the fiber expansion into the foam, the greater is the surface toughness of the laminate, while greater fiber expansion contributes to improved fire resistance. The glass expansion can range all the way from slight penetration into the foam to substantially complete distribution throughout the foam core.

Figure 4:
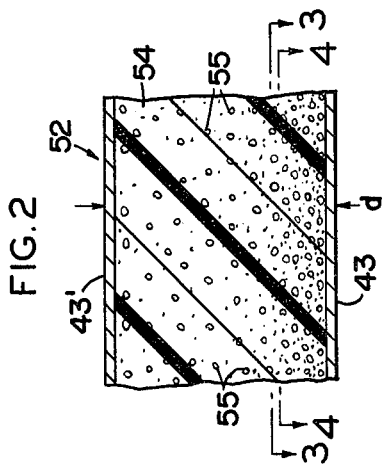
FIG. 4 is a schematic plan view of the structural laminate of FIG. 2 taken along the line 4—4 of FIG. 2, without cross hatching for the sake of clarity.
Figure 3:
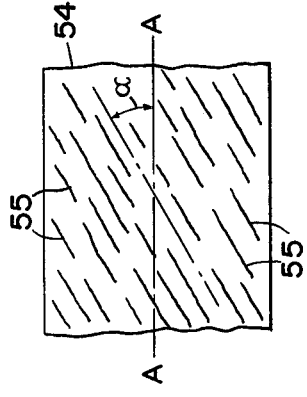
FIG. 3 is a schematic plan view of the structural laminate of FIG. 2 taken along the line 3—3 of FIG. 2, without cross hatching for the sake of clarity.

The glass fibers in each layer are at an acute angle to the glass fibers in each next adjacent layer. This is shown schematically by examining two adjacent sections, the first along line 3—3 and shown in FIG. 3 and the second along line 4—4 shown in FIG. 4. In the two FIGS. 3 and 4, a plan view of the structural laminate of FIG. 2 is shown with reference lines A—A representing the same direction in the two figures. In FIG. 3 the glass fibers 55 are shown to be running predominantly at an angle $\alpha$ to the reference line A—A while in FIG. 4 the glass fibers 55 are shown to be running predominantly at an angle $\beta$ with respect to reference line A—A. The fibers in these two adjacent layers represented by the sections shown in FIGS. 3 and 4 are aligned such that the fibers in one layer are at an angle of $\alpha$ plus $\beta$ with respect to the fibers in the next adjacent layer. The angle α plus β is generally an acute angle and is typically less than 60° in a structural laminate produced according to this invention. While each of the glass fibers 55 lies in a generally straight direction over its course through the structural laminate, it deviates about this straight-line course throughout its length. Thus, in the structural laminate there can be undulations or other deviations of the fibers 55 within the plane layers, the plane layers being substantially parallel to the facing sheet or sheets 43', 43. The undulations are induced in the fibers 55 as the foam-forming mixture 45 expands and disperses the fibers 55 in the laminate 52. The overall layered arrangement of the glass fibers within the structural laminate of the invention is nevertheless maintained dispite this fiber disorienting processing.

The overall thickness "d" of a laminate 52 produced according to this invention is typically from 0.4 to 6.0 inches while the initial thickness of the glass fiber mat 42 of the composite article is less than 0.1 inches and more typically 0.005 to 0.050 inches. The initial thickness of the glass fiber mat 42 is generally less than 1 and ½ times the separation of the facing sheets at the nip 34 of the two rotating rolls 32 and 33, the low loft of the mat 42 preventing any substantial compression by the two rolls 32 and 33.

Figure 5:
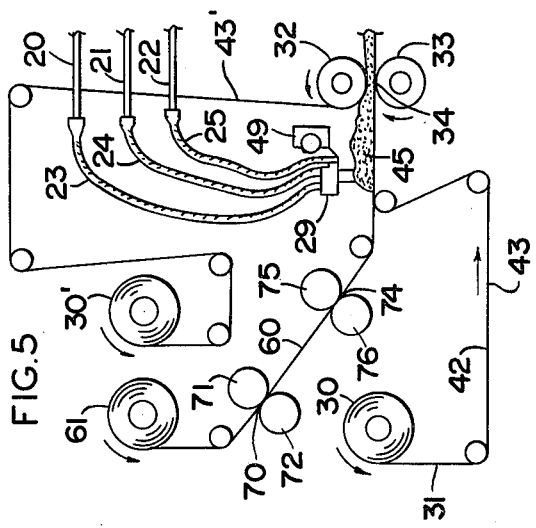
FIG. 5 is a schematic elevation of a portion of the apparatus of FIG. 1 showing a glass fiber mat being fed to the nip roll for additional reinforcement of the structural laminate.

Referring now to FIG. 5, the apparatus is the same as that shown in FIG. 1 but here a reinforcing web or scrim 60 is being fed into the apparatus. The scrim can be made from threads or yarns of any material which is non-flammable and dimensionally stable, particularly yarns which are stable to temperature changes. Fiberglass fibers are generally preferred for most applications. Typically, reinforcing web 60 will be the type of glass mat used in producing the composite article of the invention, i.e. a mat of long, generally straight glass fibers. Advantageously, the glass fibers are arranged in layers and the direction of the glass fibers in each layer is at an angle to the direction of the glass fiber in each next adjacent layer.

As shown in FIG. 5, a thin, substantially incompressible yet expansible mat 60 of glass fibers is fed from the roll 61 toward the nip 34 between the two rotating metering rolls 32 and 33. By virtue of rotation of the pull rolls 38 and 39, the lower composite article 31 is pulled from the roll 30, the upper facing sheet 43' is pulled from the roll 30', and the reinforcing glass fiber mat 60 is pulled from the roll 61. At the metering rolls the glass mat 60 and composite article 31 below it are brought together in surface-to-surface opposition relative to each other, and the foamable mixture 45 is deposited and spread onto glass fiber mat 60, mat 60 and article 31 together moving at a right angle to the traversing motion of mixing head 29. The facing sheet 43' and composite article 31, having the mat 60 and foam-forming mixture 45 therebetween, pass through the nip 34 of the two rotating metering rolls. The liquid foam-forming mixture is thereby squeezed into the interstices between the glass fibers of mats 60 and 42. Thereafter, expansion of the foam-forming mixture and of the layers of fibers of mats 60 and 42 and curing of the foam are accomplished in oven 35 in the manner hereinbefore described.

An apparatus by which stretching of the fiber mat 60 is accomplished is shown in FIG. 5. As shown in FIG. 5 the mat 60 passes first between the nip 70 of a first pair of rolls 71, 72 and then through the nip 74 of a second pair of rolls 75, 76. The axes of the rolls 71, 72, 75, 76 are perpendicular to the running length of the mat 60. The nips 70, 74 of each pair of rolls 71, 72 and 75, 76 engage the mat 60. The peripheral speed of the second pair of rolls, namely, rolls 75, 76, is greater than the peripheral speed of the first pair of rolls, namely, the rolls 71, 72. The difference in peripheral speed is adjusted such that stretching of the mat 60 is accomplished in the running or machine direction. This direction is parallel to the running length of the mat 60. An alternative to the arrangement of the two pairs of rolls is to provide the roll 61 with a brake which slows the advance of the mat 60 from the roll 61 as the mat 60 is pulled therefrom. Another and more desirable alternative for stretching of the fiber mat is to pass it through intermeshing corrugated rolls which effect a transverse stretching. Although this technique can be accompanied by heightened fiber disorientation in the mat, the layered pattern of the fibers in the mat is preserved and, after foam expansion and cure, there is obtained a rigid foam structural laminate of the invention wherein the long glass fibers of mat 60 are arranged in layers distributed in the rigid foam.

The laminate of the invention possesses a combination of desirable properties. It does not support a self-propagating fire when subjected to an open flame, and has improved structural strength and dimensional stability. The high concentration of glass fibers proximate to the facing sheet(s) of the laminate makes the faced surface(s) particularly tough and impact resistant. At the same time, the laminate has a glass fiber network(s) penetrating into its foam core, and accordingly is superior in flame resistance and inner core strength to laminates having a glass fiber layer(s) only concentrated at the faced foam surface, such as a typical chopped glass mat/foil-faced laminate. Furthermore, the laminate's glass fiber network, being bonded to the inner surface of the facing sheet and extending into and interlocking with the core foam, thereby increases the facer adhesion of the laminate.

The present invention is further illustrated by the following example in which all parts and percentages are by weight unless otherwise indicated.

EXAMPLE

This example illustrates the production of invention and comparative structural laminates.

A. PRODUCTION OF STRUCTURAL LAMINATES

Referring to FIG. 1 of the drawings, the structural laminates of the invention were produced by contacting a composite article of the invention with a foam-forming mixture. The composite article 31 of the invention was composed of a 0.0007 in thick aluminum foil 43 ("0" temper, 1145 alloy) bonded to a mat 42 of glass fibers by a polyvinylidene chloride (PVDC)/butadiene latex adhesive with an adhesive coverage of about 6-8 lb (dry)/3000 ft² of composite article. The mat was substantially incompressible and had an overall thickness of 0.030 in. The glass fibers forming the mat were long, generally straight fibers having an average diameter of less than 25 microns and lengths varying from 5 to 12 feet with an average length of over 5 feet. Intermingled with the glass fibers was a silane modified polyester binder amounting to about 12-16 percent by weight of the combined glass fiber and binder. The composite article weighed approximately 4.0 gm/ft².

The ingredients of the foam-forming mixture were arranged in tanks 11, 12 and 13 as follows:

In tank 11:

| | |
|---|---|
| polymethylenepolyphenyl isocyanate sold under the trademark "MR 200" from Mobay Chemical Corporation | 100 parts |
| fluorotrichloromethane | 18.8 parts |
| polydimethylsiloxane polyoxyalkylene copolymers sold as L-5340 available from Union Carbide | 2.16 parts |

In tank 12:

| | |
|---|---|
| diethylene glycol | 8.3 parts |

In tank 13:

| | |
|---|---|
| 2,4,6-tris (dimethylaminomethyl) phenol sold as DMP-30 from Rohm and Haas Company | 0.84 part |
| potassium-2-ethyl-hexoate | 1.75 parts |
| polyoxyethylene glycol (m.w. 200) sold as Carbowax 200 from Union Carbide Company | 7.41 parts |

The rolls 38 and 39 were started to pull the top facing sheet 43', which was a 1 mil thick aluminum foil (H-19, 1145 alloy), and composite article 31 toward the nip 34 between the two rotating metering rolls 32 and 33, the composite article being situated so that glass mat 42 lies above facing sheet 43 as the article is drawn between the metering rolls. The pumps were operated to deliver the contents of tanks 11, 12 and 13 to the mixing head 29 in a weight ratio of 100:6.87:3.04. This corresponds to an equivalent ratio of isocyanate to diethylene glycol of 4.6:1. The contents of tank 11 were maintained at 65° F., whereas the contents of tanks 12 and 13 were at 65°–75° F. The reciprocating mixing head 29 deposited the foam-forming mixture on glass fiber layer 42 of the composite article, which moved at a right angle to the traversing motion of the head. Immediately downstream of the laydown point of the foam-forming mixture, in the direction of conveyor travel, upper facing sheet 43' was brought into contact with the foamable mixture-coated surface of glass layer 42. As illustrated in FIG. 1, this was suitably effected by passing upper sheet 43' around metering roll 32 and through nip 34. At metering rolls 32 and 33 the upper and lower facing sheets were brought together in surface-to-surface opposition relative to each other, with the foamable mixture and glass fibers sandwiched in between. The facing sheets having the mat and foam-forming mixture therebetween then passed through the nip 34 of the two rotating rolls into oven 35. The foam-forming mixture filled the interstices between the individual fibers of the glass fiber mat, wetting the individual fibers of the mat. In oven 35, which was maintained at a temperature of 225° F., the foam-forming mixture expanded in the expansion zone 37 to a substantially uniform thickness.

Two structural laminate production runs A and B of the invention were conducted according to the above-described method at an average production line speed of 130 ft/min. The average chemical, i.e., foam-forming mixture, throughput for production run A was 42 lb/min, and the product thickness obtained was ½ in, and the average chemical throughput for production run B was 84 lb/min, and its product thickness was 1 in. The glass expanded into greater than 75% of the foam core in both production runs A and B.

A comparative structural laminate production run C was also conducted according to the above-described method utilizing the polyisocyanurate foam-forming mixture, as described in said method, but replacing the upper aluminum foil facer and lower composite article of the invention by an upper and a lower chopped glass mat/foil-faced laminate. In the production of this comparative laminate, the average production line speed was 130 ft/min, the average chemical throughput was 63 lb/min, and the structural laminate product thickness was ¾ in.

B. TESTING OF STRUCTURAL LAMINATES

The above-described structural laminates were subjected to fire and physical testing designed to evaluate faced foam plastic insulation board. The results of the testing are set forth below.

I. TESTING OF FIRE RESISTANCE

The Table below lists the results of corner tests performed at Jim Walter Research Corp. (JWRC), St. Petersburg, Fla. in accordance with the JWRC 8 Foot Corner Test to evaluate the burning characteristics of each of the structural laminates. The JWRC 8 Foot Corner Test is a ⅓ scale version of the well-known Factory Mutual (FM) 25 Foot Building Corner Fire Test. This FM test is described in Example 2 of U.S. Pat. No. 4,118,533. It has been found that there is a good correlation between results obtained in the 8 Foot Corner Test and those obtained in the Factory Mutual 25 Foot Corner Test. In the former corner test, the test structure is composed of steel panels, with an 8 foot high ceiling, a 16 foot long wall, and a 12 foot long wall. The structural laminates were attached to the walls and the ceiling of the test structure over the whole surface of the test structure, and the ignition source was a wood crib, placed 6½ inches from each wall in the corner. The crib weights for Structural Laminates A to C are presented in the following Table. After ignition, the crib is capable of generating temperatures over 1,000° F. in the upper corner within five minutes. This temperature is sufficient to cause a self-propagating fire if the material being tested is susceptible to such a result. The sample material is judged to have passed the test if it does not support a self-propagating fire.

II. TESTING OF FACER ADHESION

The facer adhesion of each of structural laminates A-C was tested with the Instron Universal Testing Machine, Model TTD. For each laminate, the facer bound to the glass mat was mechanically peeled from the board core around a 1 inch diameter roller at a 90° angle. Peels were made at the rate of 1 inch per minute on test samples 3 inch × 36 inch in size. Inventive structural laminates A and B were found to be vastly superior in facer adhesion to comparative structural laminate C.

TABLE

| | JWRC 8 Foot Corner Test Performance | | |
|---|---|---|---|
| STRUCTURAL LAMINATE NO. | A | B | C |
| Glass Fiber Length | 5 to 12 feet with average length of over 5 feet | 5 to 12 feet with average length of over 5 feet | 1 inch |
| Crib Weight (lb) | 73 | 71 | 72 |

TABLE-continued

| STRUCTURAL LAMINATE NO. | JWRC 8 Foot Corner Test Performance | | |
|---|---|---|---|
| | A | B | C |
| Test Length, min:sec | 10:00 | 10:00 | 8:00 |
| Max. Flame Spread (ft) - Short Wall | 6 | 6 | to end of wall |
| Max. Flame Spread (ft) - Long Wall | 6 | 6 | 10 |
| Max. Radiometer (Time) $\frac{Btu}{ft^2\text{-sec.}}$ | .071/.063 | .063/.055 | .109/.123 |
| Max. Temperatures (°F.) | | | |
| 1 - over crib - ceiling | 1650 | 1530 | 1740 |
| 2 - 6' out short wall | 1000 | 930 | 1480 |
| 3 - 12' out short wall | 690 | 650 | 880 |
| 4 - 8' out long wall | 1000 | 880 | 1500 |
| 5 - 15' out long wall | 700 | 580 | 880 |
| 6 - 5' out diagonal | 1110 | 1160 | 1380 |
| 7 - 9' out diagonal | 800 | 820 | 990 |
| Total (Max temps) | 6950 | 6550 | 7500 |
| Comments | Flame did not propagate from the corner to the end of either the short or long wall. After fire had burned out, laminate was found to have maintained structural integrity throughout test area. | Flame did not propagate from the corner to the end of either the short or long wall. After fire had burned out, laminate was found to have maintained structural integrity throughout test area. | Within 2 min 48 sec flame propagated to the end of the short wall, and flame propagated a total of 10 ft out on the long wall. Accordingly, the fire resistance of laminate C was inferior to that of laminates A and B. |

We claim:

1. A process for producing a structural laminate comprising the steps of:
   (a) providing a first composite article comprising a first facing sheet adhered to a thin, substantially incompressible yet expansible mat of glass fibers, the mat of glass fibers being further characterized by
      (1) the glass fibers being arranged in layers, and
      (2) the glass fibers within each layer being greater than one foot in length,
   (b) applying a foam-forming mixture to the glass fibers,
   (c) positioning a second facing member over the applied foam-forming mixture to form a sandwich of the first composite article and the second facing member with the foam-forming mixture therebetween, the second facing member comprising a second facing sheet,
   (d) passing the sandwich through means for metering the amount of foam-forming mixture and causing it to penetrate between the fibers of the glass mat, and
   (e) foaming the foam-forming mixture to form the structural laminate, whereby the mat of glass fibers expands under the influence of the expansion of the foam-forming mixture to become distributed in the resulting foam.

2. The process of claim 1 wherein the foam-forming mixture comprises a liquid mixture for forming a polymer foam selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams.

3. The process of claim 1 wherein the first facing sheet is bonded to the mat of glass fibers of the first composite article by a flame resistant adhesive, the glass fibers of the mat being arranged in layers which are parallel to the faces of the mat and the glass fibers in each layer being at an angle to the glass fibers in each next adjacent layer, and the glass fibers being attached to one another by an amount of fiber binder sufficient to make the mat of glass fibers dimensionally stable but insufficient to resist the separation of the glass fibers under the influence of the expanding foam-forming mixture.

4. The process of claim 3 wherein:
   (a) the means for metering the amount of foam-forming mixture and causing it to penetrate between the fibers of the glass mat comprises the nip of two rotating rolls,
   (b) the thickness of the mat prior to passing through the two rotating rolls is less than 0.1 inch, the glass fibers in each layer of the mat being at an acute angle to the glass fibers in each next adjacent layer, and
   (c) the mat of glass fibers is included in the amount of 1-24 grams per board-foot of the resulting structural laminate.

5. The process of claim 1 for producing a structural laminate comprising the steps of:
   (a) providing a first composite article comprising a first aluminum foil bonded by a flame resistant adhesive to a thin, substantially incompressible yet expansible mat of glass fibers, the mat of glass fibers being further characterized by
      (1) the glass fibers being arranged in layers which are parallel to the faces of the mat and the glass fibers in each layer being substantially parallel to each other,
      (2) the glass fibers in each layer being greater than one foot in length,
      (3) the glass fibers in each layer being at an acute angle to the glass fibers in each next adjacent layer, and
      (4) the glass fibers being attached to one another by an amount of fiber binder sufficient to make the mat of glass fibers dimensionally stable but insufficient to resist the separation of the glass fibers under the influence of the expanding foam-forming mixture,
   (d) applying a foam-forming mixture to the mat of glass fibers, the foam-forming mixture comprising a liquid reaction mixture for forming a polymer foam selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams,
(c) positioning a second aluminum foil over the applied foam-forming mixture to form a sandwich of the first composite article and the second aluminum foil with the foam-forming mixture therebetween,
(d) passing the sandwich through the nip of two rotating rolls to meter the amount of foam-forming mixture and cause it to penetrate between the fibers of the glass mat, and
(e) foaming the foam-forming mixture to form the structural laminate, whereby the mat of glass fibers expands under the influence of the expansion of the foam-forming mixture to become distributed in the resulting foam.

6. The process of claim 5 wherein:
(a) the glass fibers of the mat have an average length that exceeds five feet,
(b) the thickness of the mat prior to passing through the rotating rolls is less than 0.1 inch,
(c) the mat of glass fibers is included in the amount of 1-24 grams per board-foot of the resulting structural laminate, and
(d) the foam-forming mixture comprises a liquid mixture for forming a polymer foam selected from the group consisting of polyurethane and polyisocyanurate foams.

7. The process of claim 1 wherein reinforcing fibers are introduced between the first composite article and the second facing member to form a sandwich of the first composite article and the second facing member with the foam-forming mixture and reinforcing fibers therebetween, and the sandwich is passed through means for metering the amount of foam-forming mixture and causing it to penetrate between both the reinforcing fibers and the fibers of the glass mat of the first composite article.

8. The process of claim 7 wherein the reinforcing fibers comprise a reinforcing mat of glass fibers identical to the mat of glass fibers of the first composite article, and the glass fibers of both mats expand under the influence of the expansion of the foam-forming mixture to become distributed in the resulting foam.

9. The process of claim 1 wherein the second facing member comprises a second composite article identical to the first composite article, the second composite article is positioned so that the mat of glass fibers of the second composite article contacts the applied foam-forming mixture to form a sandwich of the two composite articles with the foam-forming mixture therebetween, the sandwich is passed through means for metering the amount of foam-forming mixture and causing it to penetrate between the fibers of the glass mats of the two composite articles, and the glass fibers of both mats expand under the influence of the expansion of the foam-forming mixture to become distributed in the resulting foam.

10. The process of claim 9 wherein the facing sheet of each composite article is bonded to the mat of glass fibers of the composite article by a flame resistant adhesive, the glass fibers of the mat being arranged in layers which are parallel to the faces of the mat and the glass fibers in each layer being at an angle to the glass fibers in each next adjacent layer, and the glass fibers being attached to one another by an amount of fiber binder sufficient to make the mat of glass fibers dimensionally stable but insufficient to resist the separation of the glass fibers under the influence of the expanding foam-forming mixture.

11. The process of claim 9 for producing a structural laminate wherein:
(a) each composite article comprises an aluminum foil bonded by a flame resistant adhesive to a thin, substantially incompressible yet expansible mat of glass fibers, the mat of glass fibers being further characterized by
 (1) the glass fibers being arranged in layers which are parallel to the faces of the mat and the glass fibers in each layer being substantially parallel to each other,
 (2) the glass fibers in each layer being greater than one foot in length,
 (3) the glass fibers in each layer being at an acute angle to the glass fibers in each next adjacent layer, and
 (4) the glass fibers being attached to one another by an amount of fiber binder sufficient to make the mat of glass fibers dimensionally stable but insufficient to resist the separation of the glass fibers under the influence of an expanding foam-forming mixture,
(b) the foam-forming mixture comprises a liquid mixture for forming a polymer foam selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams, and
(c) the means for metering the amount of foam-forming mixture and causing it to penetrate between the fibers of the glass mats comprises the nip of two rotating 12. The process of claim 9 wherein reinforcing fibers are introduced between the first composite article and second composite article to form a sandwich of the two composite articles with the foam-forming mixture and reinforcing fibers therebetween, the sandwich is passed through means for metering the amount of foam-forming mixture and causing it to penetrate between both the reinforcing fibers and the fibers of the glass mats of the two composite articles, and the foam-forming mixture is foamed, whereby the fibers become distributed in the resulting foam.

13. A structural laminate comprising:
(a) a rigid foam having two major, substantially planar, substantially parallel surfaces, one of the major surfaces of the rigid foam being attached to a planar facing sheet, the facing sheet having an adhesive coating disposed on the inner surface thereof and interposed between the facing sheet and the rigid foam, and
(b) a network of glass fibers wherein:
 (1) the glass fibers are distributed in the rigid foam,
 (2) the glass fibers are greater than one foot in length,
 (3) the glass fibers are arranged in layers,
 (4) each layer of glass fibers is substantially parallel to the facing sheet, and
 (5) the network of glass fibers is secured to the adhesive coating of the facing sheet through attachments between the adhesive coating and glass fibers of the network proximate to the adhesive coating.

14. The structural laminate of claim 13 wherein the other major surface of the rigid foam is attached to a second planar facing sheet.

15. The structural laminate of claim 14 wherein the glass fibers in each layer are at an angle to the glass fibers in each next adjacent layer.

16. The structural laminate of claim 13 wherein additional reinforcing glass fibers are embedded in the rigid foam.

17. The structural laminate of claim 13 wherein the rigid foam is a member selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams.

18. The structural laminate of claim 13 further comprising:
   (a) a second planar facing sheet attached to the other major surface of the rigid foam, the second facing sheet having an adhesive coating disposed on the inner surface thereof and interposed between the second facing sheet and the rigid foam, and
   (b) a second network of glass fibers wherein:
      (1) the glass fibers are distributed in the rigid foam,
      (2) the glass fibers are greater than one foot in length,
      (3) the glass fibers are arranged in layers,
      (4) each layer of glass fibers is substantially parallel to the second facing sheet, and
      (5) the second network of glass fibers is secured to the adhesive coating of the second facing sheet through attachments between the adhesive coating and glass fibers of the second network proximate to the adhesive coating.

19. The structural laminate of claim 18 wherein the glass fibers in each layer of the second network are at an angle to the glass fibers in each next adjacent layer.

20. The structural laminate of claim 18 wherein additional reinforcing glass fibers are embedded in the rigid foam.

* * * * *